United States Patent
Pryakhin et al.

(10) Patent No.: US 9,116,010 B2
(45) Date of Patent: Aug. 25, 2015

(54) CALCULATION OF ENERGY OPTIMIZED ROUTE

(75) Inventors: Alexey Pryakhin, München (DE); Peter Kunath, München (DE); Markus Schupfner, München (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 837 days.

(21) Appl. No.: 12/488,386

(22) Filed: Jun. 19, 2009

(65) Prior Publication Data

US 2010/0057339 A1     Mar. 4, 2010

(30) Foreign Application Priority Data

Jun. 19, 2008     (EP) .................................. 08011208

(51) Int. Cl.
  *G01C 21/00*     (2006.01)
  *G01C 21/34*     (2006.01)
  *G01C 21/26*     (2006.01)

(52) U.S. Cl.
  CPC ............ *G01C 21/3469* (2013.01); *G01C 21/26* (2013.01); *G01C 21/3484* (2013.01); *G01C 21/3492* (2013.01)

(58) Field of Classification Search
  CPC .................................................... G01C 21/26
  USPC ......... 701/123, 200, 209, 410, 413, 414, 415, 701/416, 420, 423, 424
  See application file for complete search history.

(56) References Cited

U.S. PATENT DOCUMENTS

| | | | |
|---|---|---|---|
| 5,913,917 A | 6/1999 | Murphy | |
| 6,005,494 A | 12/1999 | Schramm | |
| 6,085,147 A * | 7/2000 | Myers | ............................ 701/200 |
| 2007/0130097 A1 * | 6/2007 | Andreev et al. | .................. 706/46 |
| 2008/0133120 A1 | 6/2008 | Romanick | |

FOREIGN PATENT DOCUMENTS

| | | |
|---|---|---|
| DE | 19605458 C1 | 9/1997 |
| JP | 2006300780 | 11/2006 |
| JP | 2008101977 | 5/2008 |
| JP | 2008107155 | 5/2008 |
| WO | WO 2007/061409 A2 | 5/2007 |

* cited by examiner

*Primary Examiner* — Hunter Wilder
(74) *Attorney, Agent, or Firm* — O'Shea Getz P.C.

(57) ABSTRACT

Methods are provided for determining an energy optimized route for a vehicle. In one example, the method includes providing a plurality of cost factors, each cost factor influencing the energy consumption of the vehicle. At least one cost factor is selected from among the cost factors. A composite cost factor is determined using the selected at least one cost factor. An energy optimized route is then determined based on the composite cost factor. Systems are also provided for determining an energy optimized route for a vehicle. An example system includes a set of cost factors, each cost factor influencing the energy consumption of the vehicle. A classification unit is included for selecting cost factors for the route and for including the selected cost factors in a composite cost factor for the route. A calculator is also included for calculating the energy optimized route based on the composite cost factor.

15 Claims, 3 Drawing Sheets

CALCULATION OF ENERGY OPTIMIZED ROUTE

RELATED APPLICATIONS

This application claims priority of European Patent Application Serial Number 08 011 208.9, filed on Jun. 19, 2008, titled CALCULATION OF ENERGY OPTIMISED ROUTE; which application is incorporated in its entirety by reference in this application.

BACKGROUND OF THE INVENTION

1. Field of the Invention

This invention relates to a method and to a system for determining an energy optimized route for a vehicle.

2. Related Art

In the art, navigation systems are known which calculate a route from a present vehicle position to a predetermined destination using map data and using satellite based position determination algorithms. In these navigation systems, normally the fastest route to the destination is calculated allowing to reach the destination in the shortest time possible. Additionally, it is known to calculate a shortest route with which the destination can be reached using a path of minimum distance. With the increasing costs for energy such as fuel or gas a need exists to allow the calculation of the energy optimized route to a predetermined destination for which the energy consumption, be it fuel, gas, electric energy or any other kind of energy, is minimized.

However, the energy consumption of a vehicle when travelling along a predetermined route depends on many different factors and it is difficult to precisely predict the energy consumption of the vehicle along a predetermined route.

SUMMARY

In view of the above, a method is provided for determining an energy optimized route for a vehicle. In one example, the method includes providing a plurality of cost factors, each cost factor influencing the energy consumption of the vehicle. At least one cost factor is selected from among the cost factors. A composite cost factor is determined using the selected at least one cost factor. An energy optimized route is then determined based on the composite cost factor.

In another aspect, a system is provided for determining an energy optimized route for a vehicle. An example system includes a set of cost factors, each cost factor influencing the energy consumption of the vehicle. A classification unit is included for selecting cost factors for the route and for including the selected cost factors in a composite cost factor for the route. A calculator is also included for calculating the energy optimized route based on the composite cost factor.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
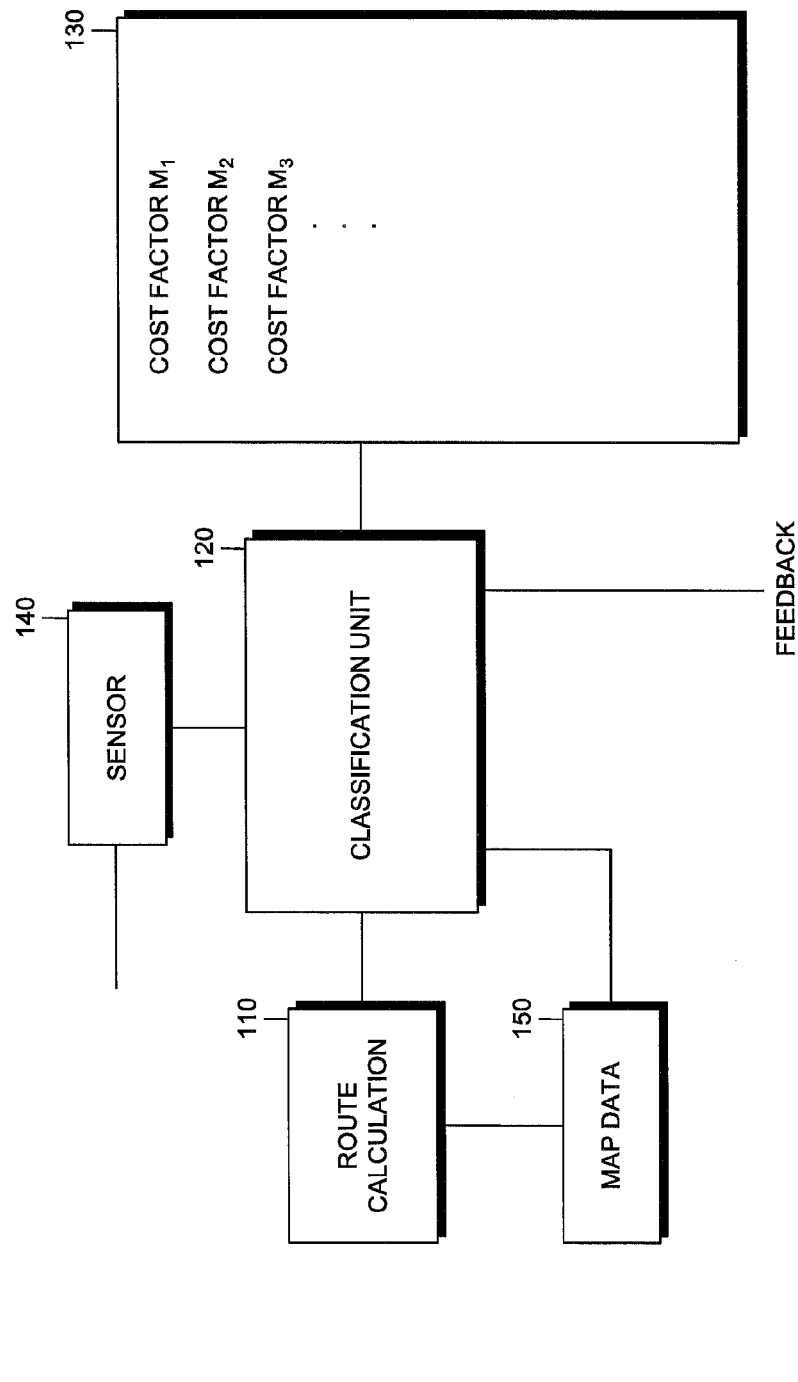
FIG. 1 is a block diagram of an example of a system for determining an energy optimized route.

FIG. 1 is a block diagram of an example of a system for determining an energy optimized route. The system 100 includes a route calculating unit 110 configured to calculate a route from a present location of a vehicle to a destination selected by the driver. The system 100 also includes a classification unit 120 to generate a composite cost factor for calculating the energy optimized route. The classification unit 120 is connected to a database 130 that includes data representing a set of cost factors, each cost factor relating to the energy consumption of the vehicle. Each cost factor may be described by a mathematical model $M_i$, that describes one aspect of the energy consumption. The mathematical models for each cost factor $M_1$, $M_2$, $M_3$ . . . may be determined in advance by using model data and by using known physical relationships used to calculate the influence of the cost factor on the energy consumption. For example, the cost factor $M_1$ may describe the energy consumption as a function of aerodynamic resistance; $M_2$ may describe the influence of the driving behaviour on the energy consumption; $M_3$ may describe the influence of the road class on the energy consumption. Other mathematical models, $M_i$, may be determined to describe the effect of other aspects of the energy consumption.

Cost factors may be viewed or organized in groups. For example, one group of cost factors includes vehicle-related cost factors, which describe the influence of the vehicle, and conditions related to the vehicle. Such factors include the engine, vehicle weight, power of the engine, the kind of engine used, the air track coefficient, and other vehicle-related factors may also be provided. The vehicle-related cost factor can be determined for each type of vehicle and stored in the vehicle.

Another group of cost factors includes user-related cost factors. For example, the user-related cost factors may include the driving habits of the driver of the vehicle taking into account the driver's acceleration and braking behaviour. User-related cost factors may be transmitted to the system from outside the system 100. For example, the user-related cost factors may be stored in the vehicle key the driver is using for starting the engine. The user-related cost factors may be transferred to the database 130. In example implementations, a user-related cost factor may be provided for each user.

Another group of cost factors may include traffic cost factors, which account for traffic patterns or traffic data received by a radio signal. Such traffic data may be received using the TMC (Traffic Message Channel) data in a radio signal.

Another group of cost factors that may be considered for calculating an energy optimized route includes map cost factors. Map data cost factors may include the road class on which a vehicle is travelling, which may be significant since the energy consumption in an urban area will be different from the energy consumption on a highway. The road inclination in the map data may also be used since energy consumption is influenced by whether the vehicle is moving uphill, downhill or straightaway.

Another group of cost factors may include cost factors associated with the vehicle environment, such as outside temperature, or other weather conditions. Weather data may be received via TMC data as well.

The classification unit 120 may select the cost factors based on their relevance to a certain part of the route. The classification unit 120 uses the selected cost factors to generate a composite cost factor. The classification unit 120 may select the cost factors based on information input from the vehicle or outside the vehicle. The input may be received by a sensor 140 as shown in FIG. 1. The sensor 140 can receive vehicle-related information such as the actual energy consumption, engine speed, vehicle speed, activation of accelerator, activation of clutch, activation of brake, vehicle weight. The information represented by the sensor 140 may also be user-related information informing the classification unit 120 about the driving behaviour of the user. For example, the sensor 140 may include access to data identifying the user and the corresponding driving behaviour characteristics.

The sensor 140 may receive information from the vehicle environment, such as the outside temperature, the speed of the vehicle driving in front of the detecting vehicle, and other information about the vehicle's external environment. Traffic related information may be received and used to inform the classification unit 120 about traffic congestions on the route to the predetermined destination. The classification unit 120 may also have access to map data 150, which may contain data that may also influence the selection and classification of the cost factors. The route calculation unit 110 calculates the route using an optimized energy consumption. The classification unit 120 determines the optimized energy consumption for each part of the route based on the composite cost factor for that part of the route. The composite cost factor is determined using the selected cost factors. Known optimization algorithms may be used to determine the route having the lowest energy consumption. The optimization algorithms may include, for example, Dijkstra algorithms or A* algorithms. The classification unit 120 may also receive certain information as feedback and use the actual energy consumption or actual driving behaviour as input to the route calculation unit 110. The route calculation unit 110 may compare the received energy consumption to the predicted energy consumption and use the results to adapt the composite energy consumption.

Additional information may be used by the classification unit 120 to determine the energy optimized route. Such information may include the number of intersections, the number of red lights, the curvature of the route, and the inclination of the road. The classification unit 120 may obtain this and other information from the map data 150. Weather information may also be used by the classification unit 120 to the extent the weather conditions along the route affect the energy consumption. Weather information may be obtained from the database 130, or via the sensor 140 using an interface to a radio signal that carries weather information.

The energy-related cost factors, such as acceleration or the aerodynamic resistance can be described by mathematical models to a good approximation. The energy-related cost factors, vehicle-related cost factors, and user-related cost factors may be used to simplify the problem of calculating the energy consumption, which is complicated by its dependence on many different factors. The different cost factors may be used to solve smaller and separate problems based on their mathematical models making it possible to calculate a composite cost factor describing the overall energy consumption to an acceptable error.

The error that results from the approximation may be reduced by careful selection of the cost factors. In example implementations, each cost factor is described by a mathematical model that may be solved to determine the energy consumption based on the respective cost factor. For example, the classification unit 120 may select cost factors based on relevance or significance to overall energy consumption. Cost factors exhibiting a greater influence on the energy consumption may be favoured over cost factors that have less influence. In addition, composite cost factors may be determined for road segments, or specific parts of the road. The road segments may be selected based on minimizing the cost factors considered in optimizing energy consumption. For example, a road may be divided into segments that are straightaway with few speed restrictions, hills or segments with inclinations, urban in nature, or segments having many curves. Composite cost factors may be determined for each segment, then combined with other composite cost factors for other segments to obtain energy consumption results for an entire route.

Figure 2:
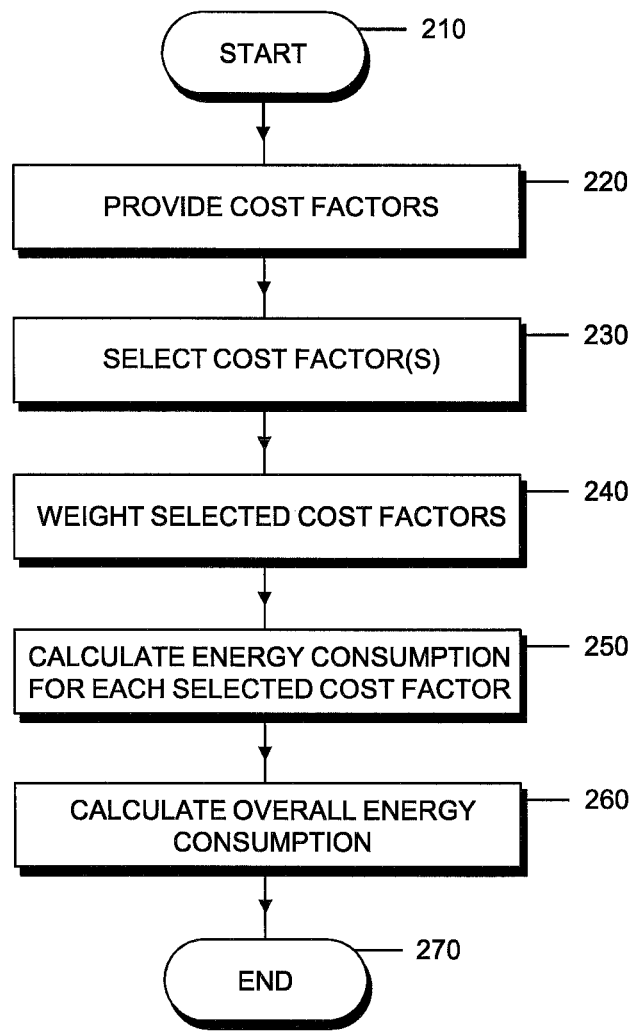
FIG. 2 is a flow chart illustrating operation of an example method for calculating an energy optimized route.

FIG. 2 is a flow chart illustrating operation of an example method for calculating an energy optimized route. The method may start at step 210 as part of a route calculation procedure in a navigation system in a vehicle. A predetermined route may be used as input. The route may be further divided into parts of the route according to characteristics that affect energy consumption. The method shown in FIG. 2 may be used for a given route, then again for an alternative route as a comparison with other routes to determine the more energy efficient route. The different cost factors are provided at step 220. Each cost factor may be described by a mathematical model that approximates the energy consumption as a function of the cost factor. The mathematical models may be solved and used to describe the contribution of the respective cost factor to the overall energy consumption. At step 230, cost factors may be selected according to their relevance to energy consumption in a certain part of the route. The mathematical models for the cost factors selected at step 230 may be used to determine the energy consumption for each selected cost factor. At step 240, the contribution of each cost factor to the overall energy consumption is determined. In one example, the contribution of each cost factor may be determined by determining a threshold contribution and comparing the energy consumption based on the cost factor with the energy consumption based on the composite cost factor. The selected cost factors may be classified according to the extent to which the comparison for each cost factor exceeds the predetermined threshold. In addition, any cost factors not contributing as much as the predetermined threshold may be excluded from the analysis. The contribution of the cost factors may be expressed as weighting factors in the expression of the composite cost factor for a certain part of the route.

At step 250, the energy consumption based on each cost factor is determined. At step 260, the overall energy consumption is determined for the different parts of the route and used to determine the overall energy consumption for the complete route. The energy optimized route may then be calculated using the steps 220 to 260 by determining the route having the lowest overall energy consumption to a destination. In an example implementation, steps may be included to compare the calculated energy consumption to the real energy consumption during driving. The comparison can then be used to adapt the process for selection and weighting of the different cost factors for the generation of the composite cost factor. The selected cost factors are those having the greatest influence on the energy consumption for the route calculation.

Figure 3:
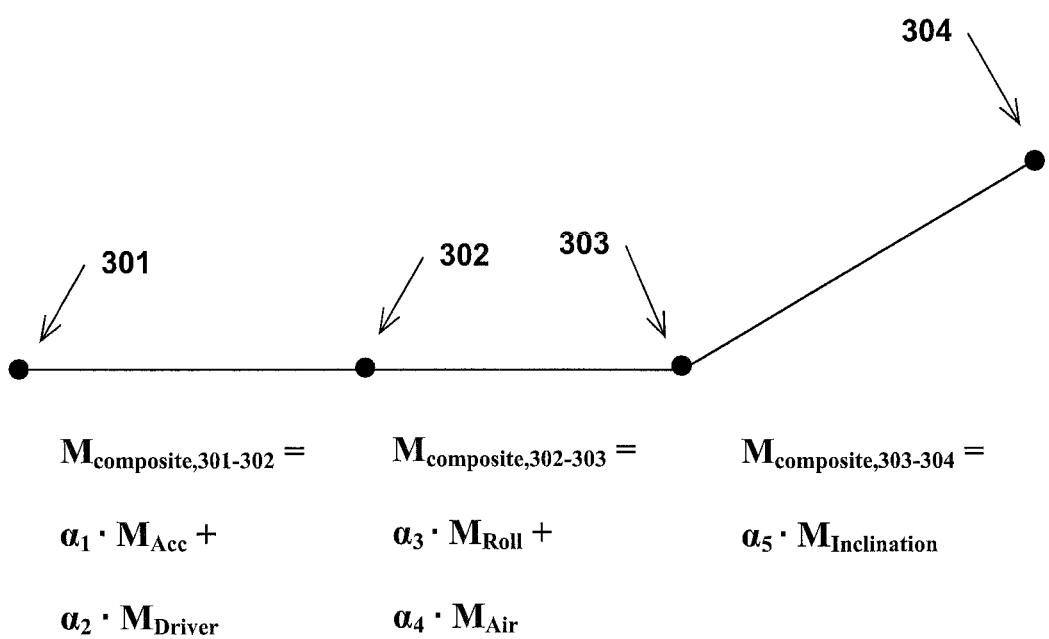
FIG. 3 is a schematic diagram illustrating an example determination of an energy optimized route.

FIG. 3 is a schematic diagram illustrating an example determination of an energy optimized route. The example in FIG. 3 illustrates how the energy consumed when driving from location 301 to location 304 via location 302 and 303 may be determined. As an example, the vehicle may be assumed to accelerate from 0 to 100 km/h using gears 1 to 5 between location 301 and 302, which may have an inclination lower than 1%. Based on these assumptions, the mathematical model describing the energy consumption depends mainly on two aspects. The first aspect is the mathematical model describing the energy costs for the vehicle acceleration, $M_{acc}$, and the other aspect is the mathematical model describing the driving behaviour of the driver $M_{driver}$. The driving behaviour mathematical model describes how the driver normally accelerates.

For the segment of the route between 301 and 302, the classification unit 120 (in FIG. 1) selects these two models ($M_{acc}$ and $M_{driver}$) and combines the models in a weighted form. The composite cost model or the composite cost factor, $M_{composite,\ 301\text{-}302}$, may be determined using a weighting coefficient for the acceleration model, $\alpha_1$, and a weighting coefficient for the driver model, $\alpha_2$. In an example implementation, the system may know from former calculations that the driving behaviour influences energy consumption more than the acceleration model. In this case, the coefficient $\alpha_2$ may be selected to be larger than the coefficient $\alpha_1$. The composite cost factor, $M_{composite,\ 302\text{-}303}$, for the segment between 302 and 303 may be expressed as:

$$M_{composite, 301\text{-}302} = \alpha_1 \cdot M_{Acc} + \alpha_2 \cdot M_{Driver} \quad \text{Equation (1)}$$

In the road segment between location 302 and 303, the driver may be driving at a constant speed of 100 km/h using one gear at a predetermined engine speed. For this part of the route, the composite model may include the rolling friction describing the friction of the tires on the road, $M_{Roll}$. Another cost factor considered for this part of the route may be the aerodynamic resistance, which is relevant to the geometrical form of the vehicle, at a speed of 100 km/h, $M_{Air}$. Both factors are weighted by weighting coefficient $\alpha_3$ and $\alpha_4$, respectively, and are combined to a composite cost factor, $M_{composite,\ 302\text{-}303}$, for the road segment between 302 and 303. In the example shown, the driving habits of the driver do not play a role when driving at constant velocity in one gear so that this cost factor is not considered for the calculation of the energy optimized route between location 302 and 303. The composite cost factor, $M_{composite,\ 302\text{-}303}$, for the segment between 302 and 303 may be expressed as:

$$M_{composite, 302\text{-}303} = \alpha_3 \cdot M_{Roll} + \alpha_4 \cdot M_{Air} \quad \text{Equation (2)}$$

The road segment between location 303 and 304 includes a hill with an inclination of about 20%, for example. The vehicle may be travelling at a constant velocity and proceeding uphill using one predetermined gear. For this part of the route, the mathematical model describing the energy consumption due to the inclination may provide the dominant cost factor. If that is the case, the inclination cost factor is used as the composite cost factor between location 303 and 304. A weighting factor, $\alpha_5$, may be determined, but set to 1 in this example if the inclination is the dominant cost factor and only one used. The composite cost factor, $M_{composite,\ 303\text{-}304}$, for the segment between 303 and 304 may be expressed as:

$$M_{composite, 303\text{-}304} = \alpha_5 \cdot M_{Inclination} \quad \text{Equation (3)}$$

The example illustrated in FIG. 3 shows how the complex problem of energy consumption may be decomposed into different smaller problems by selecting from a plurality of different cost factors described by mathematical models. By selecting the cost factors based on the driving situation for the different parts of the route, the overall energy consumption can be approximated using the mathematical description obtained using the composite cost factor. The error resulting from the approximations made during the calculation of the overall energy costs may be lowered compared to a calculation in which all factors are considered. Based on the composite cost factor for each part of the route, an overall energy consumption may be calculated for a route, and an energy optimized route can be calculated by determining the route having the lowest energy consumption.

The examples illustrated are described in the context of optimizing energy consumption. However, it is to be understood that other parameters may be optimized. For example, example implementations may be used to optimize $CO_2$ emission.

In addition, composite cost factors determined for different parts of a route may be stored for future use. The composite cost factors may be linked to the different parts of the route, respectively, and used to determine the energy optimized route.

It will be understood, and is appreciated by persons skilled in the art, that one or more processes, sub-processes, or process steps described in connection with FIGS. 1-3 may be performed by hardware and/or software. If the process is performed by software, the software may reside in software memory (not shown) in a suitable electronic processing component or system such as, one or more of the functional components or modules schematically depicted in FIGS. 1-3. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of example implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for determining an energy optimized route for a vehicle, the method comprising:
   providing a computer-implemented energy optimized route determining system having a processor configured for:
   storing a plurality of cost factors, each cost factor of the plurality of cost factors influencing the energy consumption of the vehicle;
   selecting at least one cost factor of the plurality of cost factors for each road segment of road map data, the at least one cost factor including at least one map cost factor among the plurality of cost factors, the at least one map cost factor including a road class, wherein selecting the at least one cost factor comprises:
   classifying the plurality of cost factors by the extent to which the plurality of cost factors contribute to a composite cost factor for each road segment of the road map data by more than a predetermined threshold;
   excluding cost factors of the plurality of cost factors not contributing by more than the predetermined threshold; and
   selecting cost factors of the plurality of cost factors that contribute by more than the predetermined threshold and the at least one map cost factor as the selected at least one cost factor for each road segment of the road map data;
   determining the composite cost factor using the selected at least one cost factor for each road segment of the road map data;
   storing respective composite cost factors in connection with each road segment of the road map data; and
   calculating the energy optimized route based on combining the respective composite cost factors determined for each road segment of the road map data between a current location of the vehicle to a selected destination.

2. The method of claim 1 where the at least one cost factor is further selected from a group consisting of a user cost factor, a vehicle cost factor, a traffic cost factor, and a vehicle environment cost factor.

3. The method of claim 1 further comprising:
   detecting an actual energy consumption for the calculated energy optimized route;
   comparing the actual energy consumption to an energy consumption determined for the calculated energy optimized route; and
   adapting the composite cost factor for each road segment in the energy optimized route according to the comparison.

4. The method of claim 1 further comprising:
   calculating a different composite cost factor for different parts of the energy optimized route.

5. The method of claim 1, wherein each cost factor is described by a mathematical model.

6. The method of claim 1 further comprising:
   detecting a driving behaviour of a driver; and
   adapting the composite cost factor according to the driving behaviour of the driver.

7. The method of claim 1 further comprising:
   detecting at least one of the following parameters: energy consumption, used gear, accelerator activation, break activation, clutch activation, vehicle velocity, engine temperature, outside temperature, electric power consumption of the vehicle, vehicle payload, atmospheric pressure, and tire pressure.

8. The method of claim 1 further comprising:
   detecting a traffic situation; and
   calculating the energy optimized route taking into account the traffic situation.

9. The method of claim 1 further comprising:
   detecting a driving behaviour of a driver of the vehicle when the vehicle is driving on the calculated energy optimized route; and
   adapting the calculation of the energy optimized route to the driving behaviour.

10. The method of claim 1 further comprising:
    determining an inclination of a part of the energy optimized route; and
    including at least an inclination cost factor in the composite cost factor of the part of the energy optimized route when the inclination is larger than a predetermined inclination threshold.

11. The method of claim 1 further comprising:
    detecting a road characteristic of the energy optimized route;
    selecting the cost factors in accordance with the road characteristic; and
    including the selected cost factors in the composite cost factor in accordance with the road characteristic.

12. A system for determining an energy optimized route for a vehicle, the system comprising:
    a database storing a set of cost factors, each cost factor influencing the energy consumption of the vehicle;
    a classification unit contained in a processor connected to the database for selecting cost factors of the set of cost factors including at least one map cost factor for each road segment of road map data and including the selected cost factors in a composite cost factor for each road segment of the road map data, the at least one map cost factor including a road class for each road segment of the road map data, the classification unit is configured to determine the composite cost factors using the at least one map cost factor and the selected cost factors selected by:
    classifying the set of cost factors by the extent to which the set of cost factors contribute to the composite cost factor for each road segment of the road map data by more than a predetermined threshold;
    excluding cost factors of the set of cost factors not contributing by more than the predetermined threshold; and
    selecting cost factors of the set of cost factors that contribute by more than the predetermined threshold and the at least one map cost factor as the selected cost factors for each road segment of the road map data; and
    a calculator for calculating the energy optimized route based on combining the composite cost factor for each road segment of the road map data between a current location of the vehicle to a selected destination.

13. The system of claim 12 further comprising:
    the database storing the set of cost factors as data representing mathematical models of aspects of energy consumption.

14. The system of claim 12 further comprising:
    a sensor for receiving information related to energy consumption, the sensor coupled to the classification unit.

15. The system of claim 14, wherein the sensor detects information that includes:
    actual energy consumption,
    engine speed,
    vehicle speed, activation of accelerator,
activation of clutch,
activation of brake,
vehicle weight,
driving behaviour of user,
user identity, and
any combination of the information.

* * * * *